May 18, 1948. P. SENARD 2,441,648
BAND SAW BLADE STRETCHING MACHINE
Filed Aug. 16, 1946 6 Sheets-Sheet 2

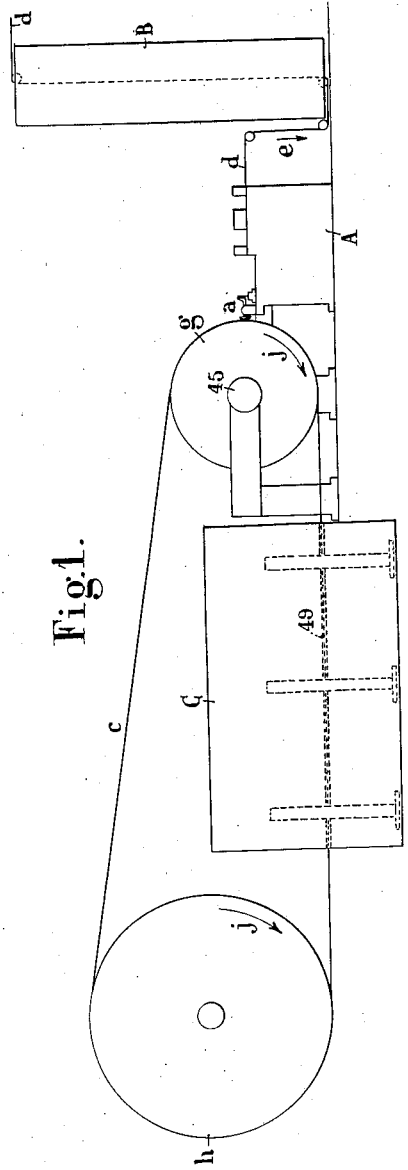
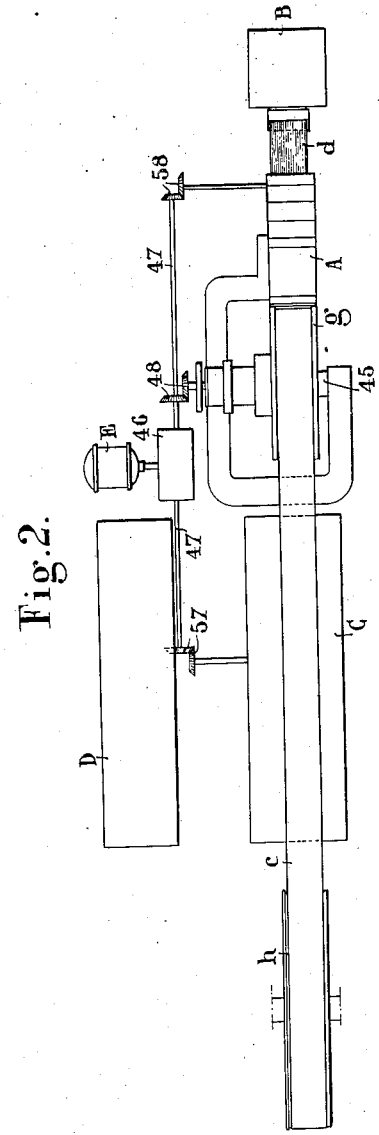

INVENTOR
PIERRE SENARD
BY
Robert E Burns
ATTORNEY

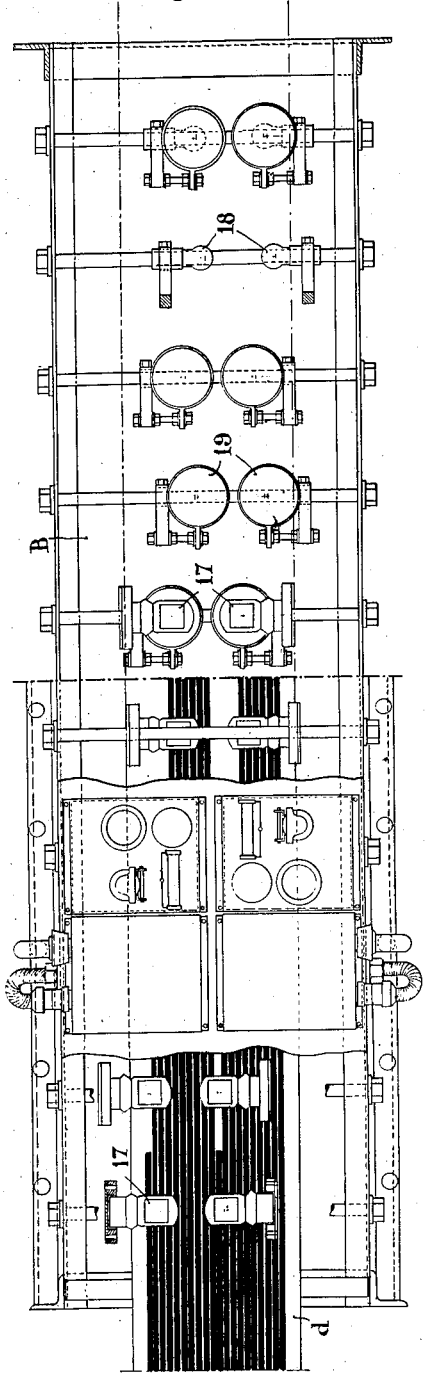

May 18, 1948.  P. SENARD  2,441,648
BAND SAW BLADE STRETCHING MACHINE
Filed Aug. 16, 1946  6 Sheets-Sheet 4

INVENTOR
PIERRE SENARD
BY
Robert E Burns
ATTORNEY

Patented May 18, 1948

2,441,648

UNITED STATES PATENT OFFICE 2,441,648

BAND SAW BLADE STRETCHING MACHINE

Pierre Senard, Bapeaume-les-Rouen, France

Application August 16, 1946, Serial No. 691,107
In France May 31, 1946

5 Claims. (Cl. 76—27)

This invention has for its object a machine designed to stretch band saw blades, that is, to subject the latter, once planished by hammering, to a series of partial rolling steps whose effect is to provide for a uniform distribution of the internal stresses which may have been disturbed most irregularly during the sawing and the hammering.

Those portions of the metal which have been overstrained form swellings which the planishing process seems to have removed but which will re-appear as the blade is bent. In order to remove them altogether it is necessary to subject those portions of the blade which remained even to a stretching step by which the elongation of the overstrained portions is offset.

The machine according to this invention is arranged to perform the said partial rolling steps in completely automatic manner; for this purpose, the machine comprises a detecting and recording device by which an image of the variously strained portions of the saw is inscribed on a band of paper; with this end in view, those portions which were overstrained in operation are set off as a result of the blade being passed over a curved support, when they will act upon a suitable printing device.

At the same time the saw blade is fed between a series of rolls which are pressed and released independently of one another depending on whether the portions of the blade therebetween are to be flattened out or not.

The rolls are urged together automatically by a photo-electric or like reading device through which the paper band is fed as the blade is moved forwards between the rolls and by which those rolls are pressed together which correspond at any given time to the points to be rolled.

A particular embodiment of a machine arranged in the aforesaid manner will now be described by way of example, reference being had to the appended drawing wherein:

Figures 1 and 2 illustrate the whole machine diagrammatically in elevational and plan view rsepectively.

Figures 5 and 6 are elevational views of a reading device.

A designates the recording apparatus comprising a swelling-detecting device $a$ and a printing device $b$ by which the image of the saw $c$ is inscribed on a paper band $d$. The latter is fed continuously in the direction shown by the arrow $e$ and then passed through the photo-electric apparatus B designed to read out the image inscribed on the band and, through the medium of electric relays, to control the pressure between the rolls in the rolling apparatus C.

The saw blade $c$ is displaced through the latter with a linear speed equal to that of band $d$ and is run over pulleys $g$ and $h$ that revolve in the direction shown by the arrows $j$. D designates a compressed air device controlled by electric relays from the reading apparatus B and adapted to actuate the rolls of the rolling apparatus C through the medium of levers.

Figure 3:
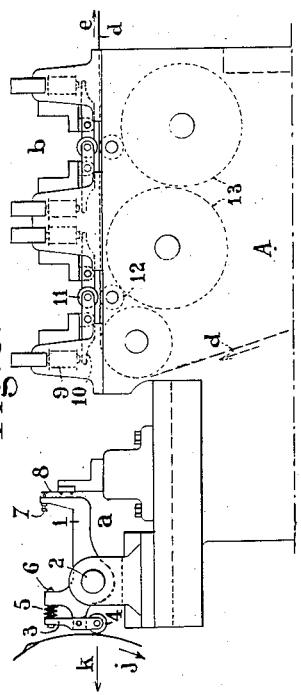
Figure 3 is an elevational view of the printing means.

The detaching device illustrated in Fig. 3 comprises a series of levers 1 mounted for free swinging motion on a horizontal spindle 2; pivoted at one end of each of said levers is a rocker 3 that carries a roller 4 and that is yieldingly held in a definite position with respect to the lever by a spring 5 and a bolt 6; carried by the other end of the rocker is a screw 7 adapted to engage a strip 8 as the roller by moving in the direction shown by the arrow $k$ comes into engagement with an unswelled portion of the saw blade $c$. The contact thus established closes the circuit for one of the electromagnets 9 of the recording apparatus $b$. Comparatively thin levers 1 and rockers 3 are used, so that they can be arranged side by side in rather considerable number over the width of the saw blades; for instance, twenty of them can be provided where the blade width is about 125 mm.

Figure 4:
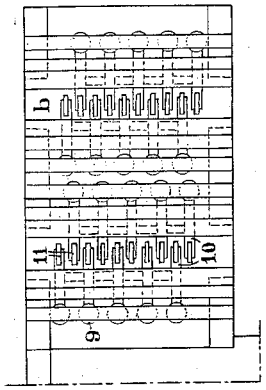
Figure 4 is a plan view of the printing means.

The electromagnets 9, which are equal in number to levers 1, are arranged in staggered rows, e. g., in four rows of five units (Fig. 4) in consideration of their width. Each of them actuates a lever 10 that carries a roller 11 adapted, whenever the related electromagnet is energized, to press the paper band $d$ into contact with one of the inking rollers 12 located slightly below the straight path followed by the band. Said rollers 12 are fed with ink by cylinders 13 mounted in the frame supporting the various parts of apparatus A. Since the levers 10 are arranged in alternating directions, the rollers 11 can be arranged in two transversal rows only, whereby the number of rollers 12 can be cut down to one single pair of them.

Levers 10 are urged by springs in such manner that each roller 11 will exert only such slight pressure as is necessary to mark a line by contact with roller 12. As a swelling in the blade moves past a roller 4 the corresponding lever 10 ceases to be attracted by its electromagnet 9 and the line marked by the roller 11 is interrupted momentarily; after which it becomes once more apparent as soon as the swelling has moved past the roller.

The image thus formed by the set of broken lines respresents in full lines the distribution of those portions of the saw blade that must be stretched out by rolling in the apparatus C. However, in the arrangement taken above as an example, the said image is distorted, or more exactly decomposed, due to the offsetting of the rows of rollers 11 with respect to each other.

Figure 5:
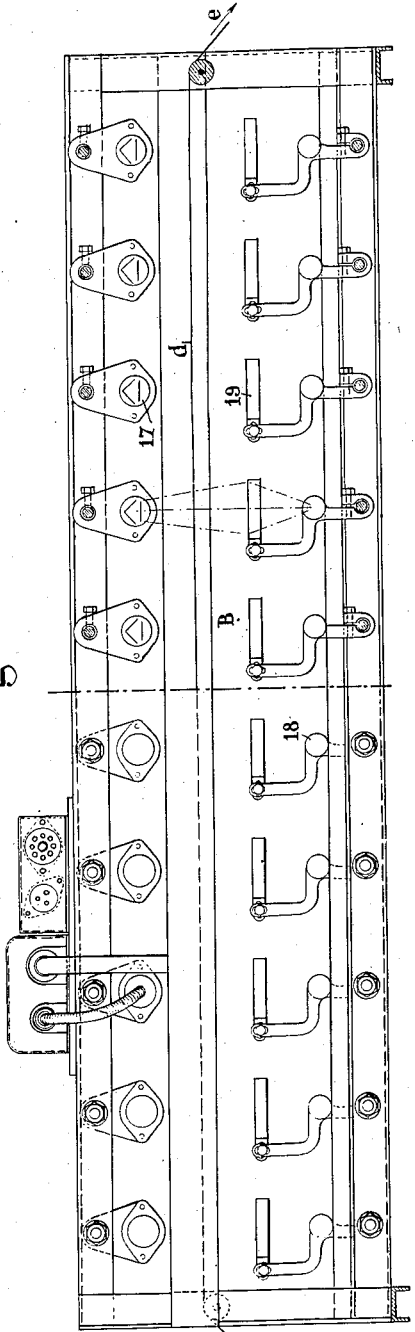
Figure 10:
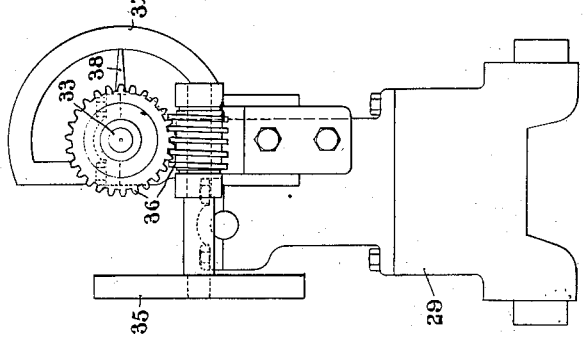
Figure 10 is an elevational view of the rolling adjusting means.
Figure 7:
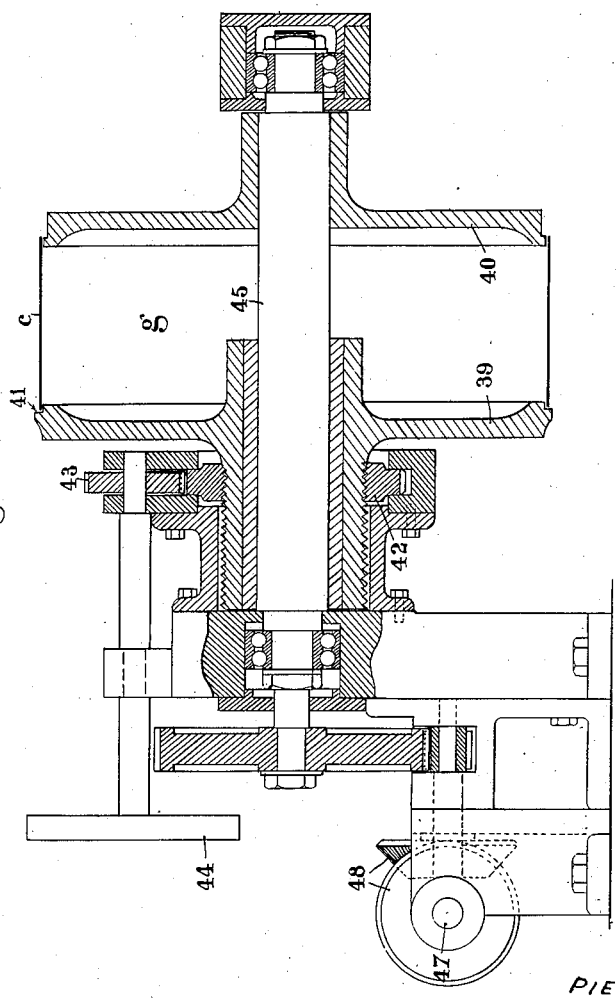
Figure 7 is a vertical sectional view through the axis of a saw feed drum.
Figure 8:
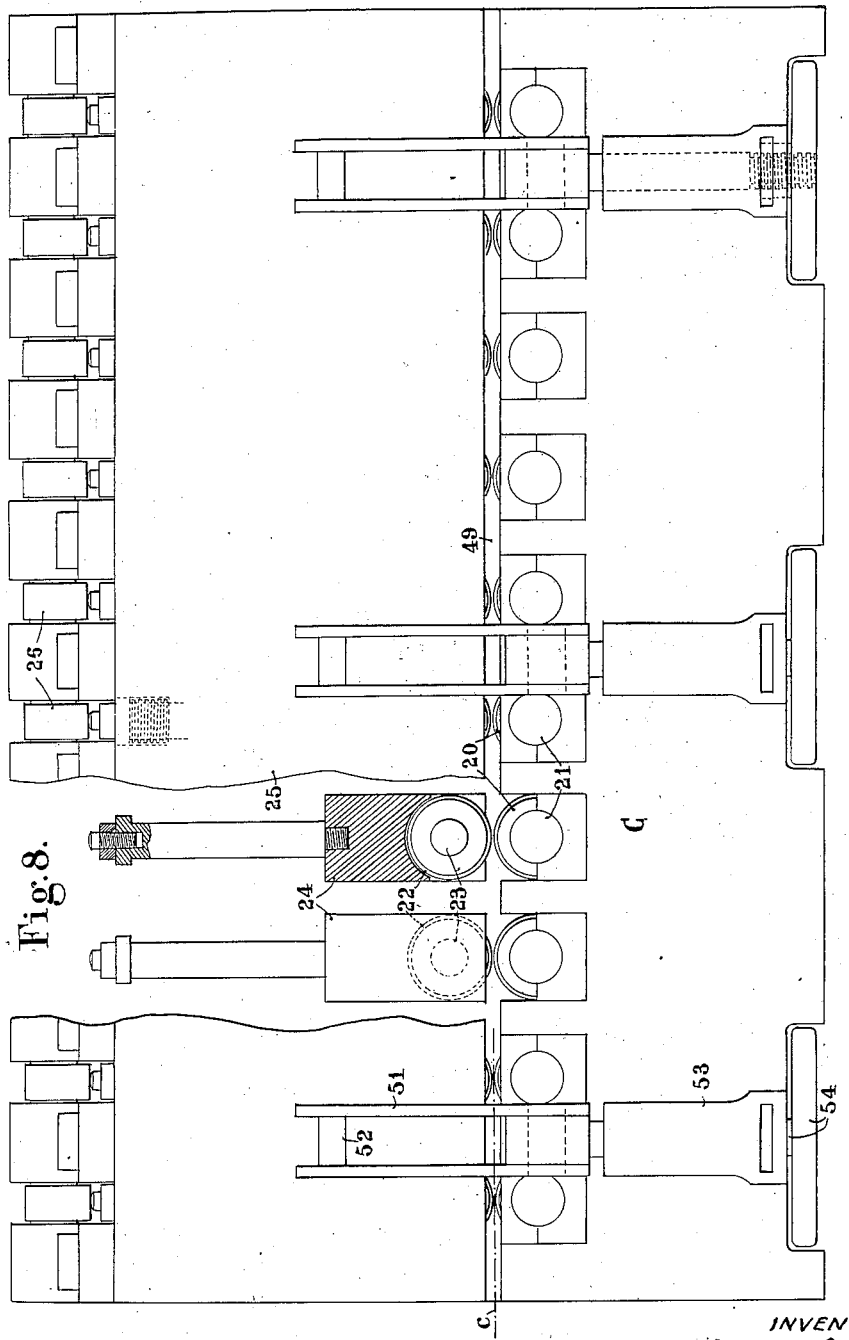
Figure 8 is an elevational view of the rolling apparatus, parts being broken away.
Figure 9:
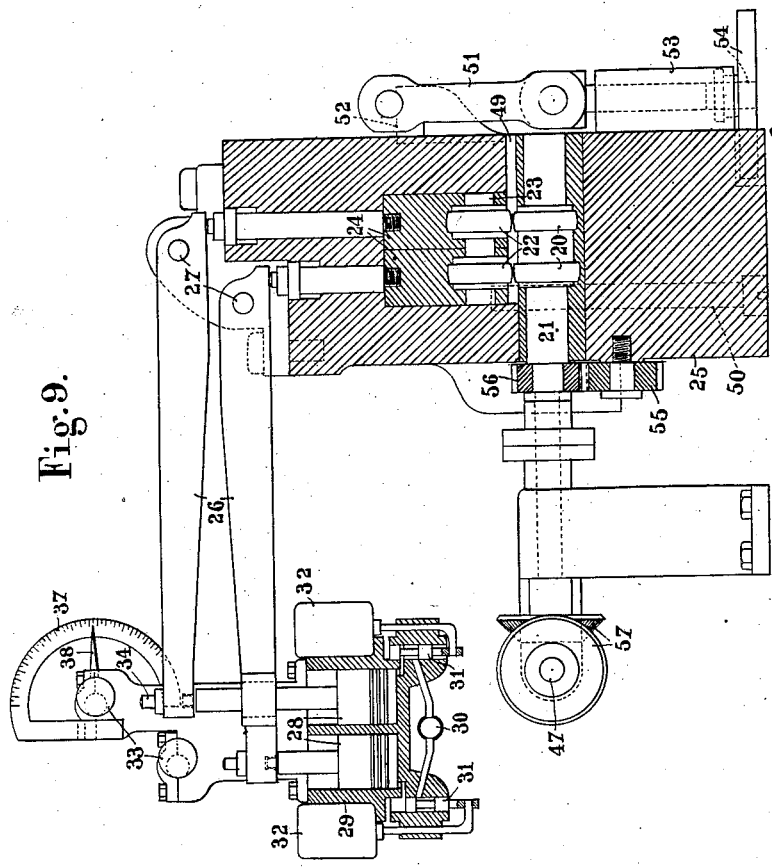
Figure 9 is a vertical sectional view illustrating the rolling apparatus control means.

The apparatus B in which said image is read out (Figs. 5 and 6) comprises a series of photo-electric cells 17 at one side of the paper band; and lamps 18 at the other side thereof whose lights are condensed upon the band by lenses 19 in front of the related cells.

Cells 17 and printing rollers 11 are provided in equal numbers; moreover, the relative positions of the former are determined in accordance with those of the latter on one hand and those of the stretching rolls on the other hand in order that said rolls shall become effective at the desired moments to act upon points on the blade that correspond exactly to the points recorded on the band.

The rolling apparatus C comprises a series of rolls 20 mounted on fixed pins 21 and a series of rolls 22 arranged below the former. The pins 22 of the last mentioned rolls are mounted in slides 24 guided vertically in the frame 25 of the apparatus and urged upwards independently of one another by levers 26 pivoted at 27 on the frame. Each lever is actuated at its other end by a piston 28 movable in a cylinder 29 to which pressure air delivered through a common pipe 30 is distributed by a valve 31. The latter in turn is controlled by an electromagnet 32 secured on each cylinder and connected through an electric relay (not shown) with the related cell 17 in apparatus B in such manner that said electromagnet 32 will be energized as long as dark portions on the paper band d move past the said cell 17.

It follows that the valve 31 is then in its upper position in which pressure air is admitted into the cylinder so that piston 28 rocks the related lever 26 and the latter presses the roll 22 with force against the saw blade f.

The rolling effect is limited to a value which is variable in dependency on the thickness of the blade, the character of the steel, etc., e. g., by means of an eccentric shaft 33 whose position is adjusted as desired and with which a stop 34 carried at the end of each lever 26 comes into engagement at the end of the upward stroke. The angular position of shaft 33 about the axis thereof is adjusted by means of a hand-wheel 35 through the medium of a worm gear coupling 36; said position is indicated on a dial 37 in front of which a pointer 38 rigid with said shaft is displaced. The swinging motion of levers 26 and consequently the pressure exerted by the rolls 22 towards the end of their downward stroke can thus be adjusted accurately.

For satisfactory operation, of course, it is necessary that the points in blade c that are to be subjected to the pressure of the rolls shall be the very ones that were recorded previously on band d; consequently, it is necessary that rolls 20 and 22 should be properly distributed with respect to the printing rolls and the photo-electric cells; in other words, the distances from roller 4 to the related rollers 20, 22 and from the printing cell 17 should be the same on each of the twenty parallel lines on the blade that move past the rolls 4 and on each of the twenty lines on band d that move past the cells.

Provided this requirement is fulfilled it is obviously possible to modify the distribution of the various parts and the number of the same in accordance with the width of the saw blades, the width of the members to be aligned, the desired spacing of the lines of rolling, etc.

In order that the saw blade shall not be interfered with in any way as it is bent in front of the detecting rollers 4 and the swellings therein must form freely a rimless pulley $g$ is used which is reduced to a pair of circular discs 39, 40 at least one of which is formed with a flange 41 to guide the back edge of the saw blade and whose spacing can be adjusted in accordance with the width of the latter so that same shall only be supported at both edges thereof. For that purpose, one disc of the pair has a threaded hub and can be displaced axially by means of a toothed ring nut 42 adapted to act both as a nut with respect to the hub and as a pinion meshing with a driving pinion 43 actuated with the aid of a hand-wheel 44; it will be appreciated that rotation of the pinion, due to the fact that same is unmovable axially with respect to the frame, enables altering the position of the disc 40 and consequently the effective width of the pulley $g$.

The shaft 45 on which said pulley is keyed has a continuous rotational motion imparted thereto by a motor arranged at E through a speed-reducing gear 46, a transmission shaft 47 and a set of bevel gears 48.

It may be useful to replace pulley $g$ by a similar one of different diameter when saw blades are to be stretched whose widths and thicknesses are materially different.

Instead of a white paper band and black ink various other colours can be used, or light-sensitive papers, such as ozalide paper or the like, or the swellings in the blade can be recorded, instead of photo-chemically, by mechanical or electrical means, e. g., by perforation; in the latter case detection can be performed with the aid of suitable feelers whose penetration through the perforation will cause the actuation of the stretching rolls.

It is to be remarked that it remains within the scope of the invention to allow the detecting members to operate in the reversed way, which means that instead of detecting protuberances at the outer side of the blade depressions in its inner side can as well be detected by means of feeling members arranged within pulley $g$ or with the aid of an equivalent rotary or fixed curved support.

Where very wide saw blades are to be dealt with it may be advantageous, in order to decrease the number of stretching rolls, to design the machine and particularly apparatus C in such manner that either the saw blade or the whole of the stretching rolls transversally by an amount equal to one or several fractions of the distance between the simultaneous stretching lines; it becomes thus possible, by passing the blade repeatedly between the rolls, to obtain a correct rolling effect on the whole width of the same, ever so few rolls may be used.

In order to make it easier to set the blade in position within the rolling apparatus C a slit 49 for the free passage of the lower side of the saw blade in the transversal direction should be provided in frame 25 across the interval between rolls 20 and 22. For that purpose said frame is made up of two parts arranged above each other and assembled rigidly at its side opposite to slit 49 by dead bolts 50 and at this side of the slit by hinged bars 51 whose upper ends are borne at 52 upon the top of the frame whilst their lower ends are clamped below projections 53 on the bottom portion of the frame through the medium of a spindle-and-nut locking device 54.

A continuous rotational movement is imparted to all the bearing rolls 20 mounted in the lower half of the frame 25, their circumferential speed being equal to that of pulley $g$; for that purpose, the shafts 21 rigid therewith are coupled together by means of pinions 55 and 56 and one of them is connected through a set of bevel gears 57 with the main shaft 47 driven by the motor.

Said shaft will also transmit the necessary rotational movement to the recording mechanism A through a pair of pinions 58 so as to move the band $d$ and the inking cylinder with the desired speed.

Of course, the invention is not limited to the details of constructive character as described above or illustrated, and it extends to all substantially equivalent modifications.

I claim:

1. A machine for the stretching of band saw blades following the planishing step, comprising guiding and driving means to displace a band saw blade longitudinally in continuous motion, a series of stretching rolls arranged by pairs in at least one line oblique with respect to the direction of said band saw blade, compressed air actuated mechanisms to press said rolls together independently from one another, feelers adapted to engage said band saw blade on a portion thereof where same is bent sufficiently to cause the overstrained portions thereof to swell out, and electric means energized by said feelers to control the distribution of compressed air to said compressed air actuated mechanisms in accordance with the passage of variably strained portions of said band saw blade between the corresponding stretching rolls.

2. A saw blade stretching machine as claimed in claim 1 wherein the means for guiding and driving said band saw blade comprise a pair of rotary pulleys on which said band saw blade is stretched as to cause the overstrained portions of this band saw blade to swell out with respect to the unstrained portions as said band saw blade runs over one of said pulleys, the feelers being arranged in front of said pulley.

3. A band saw blade stretching machine as claimed in claim 1 wherein the electric means controlling the distribution of compressed air comprises a recording band, means to displace said band longitudinally with the same speed as the saw blade, printing members controlled by the corresponding feelers and adapted to print marks distributed in separate longitudinal lines on said band in concordance with the positions of the respective feelers, a series of photo-electric cells arranged to detect the presence or the absence of said marks as the recording band is travelled in front of the cells, electromagnetic relays associated with said cells and electromagnets fed by said relays to control the distribution of compressed air to the respective compressed air controlled mechanisms.

4. A saw blade stretching machine as claimed in claim 1 comprising a fixed frame in which the stretching rolls and the air-operated pressing means therefor are mounted, a slit in one side of said frame extending from one end thereof to the other in the plane of rolling wherethrough an endless saw band can be inserted between the stretching rolls, in combination with detachable connecting means whereby either portion of the frame thus divided can be assembled rigidly.

5. A machine for the stretching of band saw blades following the planishing step, comprising guiding and driving means to displace a band saw blade longitudinally in continuous motion, a series of stretching rolls arranged by pairs in at least one line oblique with respect to the direction of said band saw blades, fluid pressure actuated mechanisms to press said rolls together independently from one another, feelers adapted to engage said band saw blade on a portion thereof where same is bent sufficiently to cause the overstrained portions thereof to swell out, and electric means energized by said feelers to control the fluid pressure to said fluid pressure actuated mechanisms in accordance with the passage of variably strained portions of said band saw blade between the corresponding stretching rolls.

PIERRE SENARD.

REFERENCES CITED

The following references are of record in the file of this patent:

UNITED STATES PATENTS

| Number | Name | Date |
|---|---|---|
| 2,217,145 | Stihl | Oct. 8, 1940 |
| 2,413,919 | Huffsmith | Jan. 7, 1947 |